(12) United States Patent
Yun et al.

(10) Patent No.: US 11,276,142 B2
(45) Date of Patent: Mar. 15, 2022

(54) APPARATUS AND METHOD FOR SYNTHESIZING VIRTUAL VIEWPOINT IMAGES

(71) Applicant: ELECTRONICS AND TELECOMMUNICATIONS RESEARCH INSTITUTE, Daejeon (KR)

(72) Inventors: Joung-Il Yun, Daejeon (KR); Sang-Woon Kwak, Daejeon (KR); Won-Sik Cheong, Daejeon (KR); Gi-Mun Um, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 16 days.

(21) Appl. No.: 15/931,410

(22) Filed: May 13, 2020

(65) Prior Publication Data

US 2020/0410638 A1 Dec. 31, 2020

(30) Foreign Application Priority Data

Jun. 27, 2019 (KR) .................. 10-2019-0077060
Mar. 10, 2020 (KR) .................. 10-2020-0029613

(51) Int. Cl.
*G06T 3/00* (2006.01)
*G06T 7/55* (2017.01)
(Continued)

(52) U.S. Cl.
CPC ............ *G06T 3/0093* (2013.01); *G06T 3/005* (2013.01); *G06T 7/536* (2017.01); *G06T 7/55* (2017.01); *G06T 7/90* (2017.01); *G06T 15/205* (2013.01)

(58) Field of Classification Search
None
See application file for complete search history.

(56) References Cited

U.S. PATENT DOCUMENTS 8,218,854 B2 * 7/2012 Liu .................. G06T 15/205
382/154
9,600,869 B2 3/2017 Chiang et al.
(Continued)

FOREIGN PATENT DOCUMENTS

KR 10-2012-0059955 A 6/2012
KR 10-1239740 B1 3/2013
KR 10-2019-0011224 A 2/2019

OTHER PUBLICATIONS

S. Fachada, D. Bonatto, A. Schenkel and G. Lafruit, "Depth Image Based View Synthesis With Multiple Reference Views For Virtual Reality," 2018—3DTV-Conference: The Truevision—Capture, Transmission and Display of 3D Video (3DTV-CON), 2018, pp. 1-4, doi: 10.1109/3DTV.2018.8478484. (Year: 2018).*

(Continued)

*Primary Examiner* — James A Thompson
(74) *Attorney, Agent, or Firm* — Rabin & Berdo, P.C.

(57) ABSTRACT

Disclosed herein are an apparatus and method for synthesizing virtual viewpoint image. The apparatus for synthesizing virtual viewpoint images includes one or more processors, and an execution memory for storing at least one program that is executed by the one or more processors, wherein the at least one program is configured to receive multiple viewpoint images from cameras that capture images of multiple viewpoints, and back-project the multiple viewpoint images onto a world coordinate system in a three-dimensional (3D) space, generate warped images by performing triangular warping of projecting the multiple viewpoint images, back-projected onto the world coordinate system, onto a virtual viewpoint image coordinate system, and generate a finally synthesized virtual viewpoint image by blending the warped images.

10 Claims, 6 Drawing Sheets

(51) Int. Cl.
*G06T 7/536* (2017.01)
*G06T 15/20* (2011.01)
*G06T 7/90* (2017.01)

(56) References Cited

U.S. PATENT DOCUMENTS

| | | |
|---|---|---|
| 10,360,313 B2 | 7/2019 | Yoon et al. |
| 2019/0318453 A1 | 10/2019 | Jung et al. |
| 2020/0104975 A1* | 4/2020 | Banerjee ................ A63F 13/50 |
| 2020/0162714 A1* | 5/2020 | Kwak .................. G06T 3/0093 |
| 2020/0226816 A1* | 7/2020 | Kar ....................... G06T 15/503 |
| 2020/0372710 A1* | 11/2020 | Wang .................... B29C 64/386 |

OTHER PUBLICATIONS

S. Yaguchi and H. Saito, "Arbitrary viewpoint video synthesis from multiple uncalibrated cameras," in IEEE Transactions on Systems, Man, and Cybernetics, Part B (Cybernetics), vol. 34, No. 1, pp. 430-439, Feb. 2004, doi: 10.1109/TSMCB.2003.817108. (Year: 2004).*

ISO/IEC JTC1/SC29/WG11 MPEG/N18068 "Reference View Synthesizer (RVS) manual," International Organisation for Standardisation: Coding of Moving Pictures and Audio, Oct. 2018, Macau SAR, CN.

* cited by examiner

APPARATUS AND METHOD FOR SYNTHESIZING VIRTUAL VIEWPOINT IMAGES

CROSS REFERENCE TO RELATED APPLICATIONS

This application claims the benefit of Korean Patent Application Nos. 10-2019-0077060, filed Jun. 27, 2019 and 10-2020-0029613, filed Mar. 10, 2020, which are hereby incorporated by reference in their entireties into this application.

BACKGROUND OF THE INVENTION

1. Technical Field

The present invention relates generally to technology for processing and synthesizing images, and more particularly, to image-warping technology based on depth information, image-processing technology based on a three-dimensional (3D) coordinate system, and technology for synthesizing virtual viewpoint images.

2. Description of the Related Art

Virtual viewpoint synthesis uses technology for warping images based on the depth information of pixels so as to synthesize images captured by virtual viewpoint cameras between input viewpoint cameras.

As multiple input viewpoint images, which include sufficient omnidirectional spatial information acquired from various locations and directions, and accurate depth information are provided, image-warping technology may synthesize virtual viewpoint images which provide a natural parallax change depending on 6 Degrees of Freedom (6DoF) motion, in which rotation and motion are combined with each other, as well as intermediate viewpoint images between input viewpoints.

Also, in the image-warping technology, when a warped image at a virtual viewpoint location is generated by performing warping on a pixel basis, a depth image at a virtual viewpoint is obtained via forward warping, and the colors of pixels of the image warped to a virtual viewpoint are determined via backward warping using the depth image at the virtual viewpoint.

During this process, there may occur in the depth image at a virtual viewpoint, not only a common hole caused by an occlusion area but also a small hole such as a crack while each pixel is mapped to an integer index in an image coordinate system in 3D space. In order to eliminate such holes before backward warping is performed, a median filter is used. However, when virtual viewpoint images at locations at which rotation and motion are combined with each other and an overlap between objects and the change of viewpoint are large are synthesized with each other, a hole in a foreground object area is filled with the depth of a background area, so that a warped depth image is distorted (i.e., artifacts occur), and thus synthesis quality may be deteriorated.

Meanwhile, Korean Patent Application Publication No. 10-2018-0086154 entitled "Method and Apparatus for Acquisition and Representation of 6DoF 360 VR Video" discloses an apparatus and method for providing a 360-degree virtual reality (VR) video which acquire an input image from a camera, acquire an image indicating 3D spatial information using the acquired input image, generate virtual viewpoint images in horizontal and vertical directions based on the 3D spatial information, and generate a stitched image using the virtual viewpoint images and the input image.

SUMMARY OF THE INVENTION

Accordingly, the present invention has been made keeping in mind the above problems occurring in the prior art, and an object of the present invention is to provide synthesis of virtual viewpoint images having improved quality.

Another object of the present invention is to eliminate artifacts occurring in image synthesis.

A further object of the present invention is to improve the quality of image synthesis in an omnidirectional image in virtual reality (VR).

Yet another object of the present invention is to utilize the synthesis of virtual viewpoint images for VR video service for providing a more highly immersive 6 DoF viewpoint.

In accordance with an aspect of the present invention to accomplish the above objects, there is provided an apparatus for synthesizing virtual viewpoint images, including one or more processors, and an execution memory for storing at least one program that is executed by the one or more processors, wherein the at least one program is configured to receive multiple viewpoint images from cameras that capture images of multiple viewpoints, and back-project the multiple viewpoint images onto a world coordinate system in a three-dimensional (3D) space, generate warped images by performing triangular warping of projecting the multiple viewpoint images, back-projected onto the world coordinate system, onto a virtual viewpoint image coordinate system, and generate a finally synthesized virtual viewpoint image by blending the warped images.

The triangular warping may be configured to configure three adjacent pixels in the multiple viewpoint images as each triangular surface and to project the triangular surface onto the virtual viewpoint image coordinate system.

The at least one program may be configured to, when at least two triangular surfaces are projected onto an identical pixel location in the virtual viewpoint image coordinate system, generate the warped images in consideration of a triangular projection condition.

The at least one program may be configured to compare ratios of triangle quality values of the at least two triangular surfaces projected onto the virtual viewpoint image coordinate system to depth values of the pixels, as the triangular projection condition, and then determine any one triangular surface.

The at least one program may be configured to calculate coordinates of vertices of the at least two triangular surfaces projected onto the virtual viewpoint image coordinate system using sinusoidal projection and calibrate the triangle quality values using the coordinates of the vertices.

The at least one program may be configured to calculate blending weights using the ratios of the triangle quality values to the depth values of the pixels and blend the warped images using the blending weights.

In accordance with another aspect of the present invention to accomplish the above objects, there is provided a method for synthesizing virtual viewpoint images, the method being performed by an apparatus for synthesizing virtual viewpoint images, the method including receiving multiple viewpoint images from cameras that capture images of multiple viewpoints, and back-project the multiple viewpoint images onto a world coordinate system in a three-dimensional (3D) space, generating warped images by performing triangular warping of projecting the multiple viewpoint images, back-projected onto the world coordinate system, onto a virtual viewpoint image coordinate system, and generating a finally synthesized virtual viewpoint image by blending the warped images.

The triangular warping may be configured to configure three adjacent pixels in the multiple viewpoint images as each triangular surface and to project the triangular surface onto the virtual viewpoint image coordinate system.

Generating the warped images may be configured to, when at least two triangular surfaces are projected onto an identical pixel location in the virtual viewpoint image coordinate system, generate the warped images in consideration of a triangular projection condition.

Generating the warped images may be configured to compare ratios of triangle quality values of the at least two triangular surfaces projected onto the virtual viewpoint image coordinate system to depth values of the pixels, as the triangular projection condition, and then determine any one triangular surface.

Generating the warped images may be configured to calculate coordinates of vertices of the at least two triangular surfaces projected onto the virtual viewpoint image coordinate system using sinusoidal projection and calibrate the triangle quality values using the coordinates of the vertices.

Generating the finally synthesized virtual viewpoint image may be configured to calculate blending weights using the ratios of the triangle quality values to the depth values of the pixels and blend the warped images using the blending weights.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
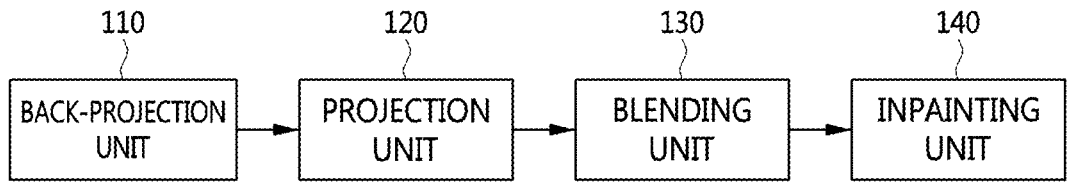
FIG. 1 is a block diagram illustrating an apparatus for synthesizing virtual viewpoint images according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

FIG. 1 is a block diagram illustrating an apparatus for synthesizing virtual viewpoint images according to an embodiment of the present invention.

Referring to FIG. 1, the apparatus for synthesizing virtual viewpoint images according to the embodiment of the present invention includes a back-projection unit 110, a projection unit 120, a blending unit 130, and an inpainting unit 140.

The back-projection unit 110 may receive multiple viewpoint images from cameras which capture images at multiple viewpoints, and may back-project the multiple viewpoint images onto a world coordinate system in 3D space.

Here, the back-projection unit 110 may back-project the multiple viewpoint images onto the world coordinate system in a 3D space using a predefined image projection scheme and parameters of the cameras.

The projection unit 120 may generate warped images by performing triangular warping which projects the multiple viewpoint images, back-projected on the world coordinate system, onto an image coordinate system corresponding to virtual viewpoints (hereinafter also referred to a "virtual viewpoint image coordinate system").

In this case, the projection unit 120 may configure three adjacent pixels in the multiple viewpoint images as each triangular surface, and may project configured triangular surfaces onto the virtual viewpoint image coordinate system.

Here, the projection unit 120 may project triangular surfaces (or triangles), which are affine-transformed in various forms depending on the difference between the depths of vertices of triangles and the change of the viewpoint to a virtual viewpoint in a triangular warping process, onto the virtual viewpoint image coordinate system.

In this case, the projection unit 120 may determine the colors of pixels within each projected triangle by interpolating the colors of pixels at the locations onto which the vertices are projected, based on the ratio of the area of a triangle, which is defined by the locations onto which respective pixels of the projected triangle are projected, to the area of a triangle, which is defined by the locations onto which the vertices of the projected triangle are projected.

When at least two triangular surfaces are projected onto the same pixel location in the virtual viewpoint image coordinate system, the projection unit 120 may generate the warped images in consideration of a triangular projection condition.

In this case, the projection unit 120 may determine any one triangular surface by comparing the ratios of the triangle (triangular shape) quality values of at least two triangular surfaces projected onto the virtual viewpoint image coordinate system to the depth values of the pixels, as the triangular projection condition.

The projection unit 120 may eliminate artifacts occurring near poles formed during a procedure for projecting an Equi-Rectangular Projection (ERP) format image.

In triangular warping, the shape of a triangle may change depending on the difference between the depths of pixel points and the change of viewpoint. In particular, in a portion corresponding to a boundary (edge), at which a severe depth difference appears, a triangle having an excessively sagged shape may be projected, unlike a change in the shape occurring in the surface of an actual object.

The change of viewpoint which provides 6DoF in which rotation and motion are combined with each other may cause a phenomenon in which multiple triangles are warped to the same pixel location.

When multiple triangles are projected onto the same pixel location because a previously warped triangle has already been projected onto the corresponding warped image, the projection unit 120 may identify the triangular projection condition based on a triangle quality value triangle_shape depending on the sagging of each triangle and the depth of each pixel depth, as represented by the following Equation (1):

$$\frac{\text{triangle\_shape}_{new}}{depth^\alpha_{new}} > \frac{\text{triangle\_shape}_{old}}{depth^\alpha_{old}} \quad (1)$$

Here, when the triangular projection condition of Equation (1) is satisfied, the projection unit 120 may generate a warped image by replacing the color of a pixel within the triangle with the color of the corresponding pixel within a newly projected triangle.

In Equation (1), triangle_shape may be a triangle quality value obtained by quantitatively calculating the quality of the warped triangle depending on the projected shape of the warped triangle.

Since the triangle quality value is in inverse proportion to the length of the longest side of the projected triangle, it may then have a smaller value as the length of the longest side increases.

All of the pixels within the projected triangle may have the same triangle quality value triangle_shape.

Here, the maximum value and the minimum value of triangle_shape may be limited such that triangle_shape has values falling within a specific range. Also, triangle_shape may be implemented using variously modified calculation methods, which are not limited to specific methods in the present invention.

The pixel depth depth denotes the depth value of each pixel within the projected triangle estimated by interpolating the depth values of pixels at three vertices of the projected triangle, and may be a vertical distance in the case of a perspective format and a linear distance from a projection center in the case of an ERP format, depending on the projection format of the synthesized images.

Here, exponent α in depth$^\alpha$ may be a parameter which can be used to control the degrees of importance of triangle_shape and depth upon identifying the triangular projection condition.

As the value of the exponent α, about 3, for example, may be used.

When pixels within multiple warped triangles are projected onto a specific pixel location of a warped image and the color at the corresponding pixel location should be determined to be the color of any one of multiple candidate pixels, the projection unit 120 may select the finally projected pixel as the depth decreases (i.e., as vertices are closer) and the triangle quality value increases (i.e., as a change in a shape is smaller), and may then determine the color of the warped image.

Therefore, the projection unit 120 may select a pixel within a triangle warped to the surface portion of an object closer to the specific pixel location, and may not select a pixel within a triangle warped in the shape of a sagged triangle in a boundary portion, unlike an actual shape, or a pixel within a triangle warped to the background portion that is to be hidden and invisible due to the great depth.

Further, in the case of an ERP format image, the shape of a projected triangle may change depending on the latitude of the ERP image coordinate system, in addition to the change depending on the depth difference or the viewpoint change.

In this case, the projection unit 120 may use the triangle quality differently by separating a warping process and a blending process in order to solve the problem with a conventional scheme that uses triangle quality in which the features of an ERP format image are not taken into consideration.

The projection unit 120 may use sinusoidal projection as one method for minimizing the influence of the latitude of the ERP image on a change in the shape of the projected triangle.

The projection unit 120 may use the triangle quality value triangle_shape_calib, which is calculated by calibrating the vertices of the projected triangle using sinusoidal projection, as the triangle projection condition, so as to minimize the influence of the latitude of the ERP image.

In this case, the projection unit 120 may project the ERP format image so that, regardless of the latitude, the areas of regions having the same size are similar areas using sinusoidal projection.

The projection unit 120 may solve a problem in which the size of a triangle changes depending on the latitude of the ERP format image.

Assuming that the three vertices A, B, and C of the projected triangle are $(x_A, y_A)$, $(x_B, y_B)$, and $(x_C, y_C)$, the projection unit 120 may calculate the coordinates of $(x'_A, y'_A)$, $(x'_B, y'_B)$, and $(x'_C, y'_C)$ of the vertices A', B' and C' of each triangle that is calibrated by applying sinusoidal projection to the triangle based on the longitude, as represented by the following Equation (2):

$$x_0 = \frac{x_A + x_B + x_C}{3} \quad (2)$$
$$x'_A = (x_0 - x_A)\cos(\varphi_A), \; y'_A = y_A$$
$$x'_B = (x_0 - x_B)\cos(\varphi_B), \; y'_B = y_B$$
$$x'_C = (x_0 - x_C)\cos(\varphi_C), \; y'_C = y_C$$

Here, $\varphi_A$, $\varphi_B$, and $\varphi_C$ denote respective latitudes of A, B, and C.

The projection unit 120 may calculate $x_0$ based on individual triangles using sinusoidal projection, as shown in Equation (2), may set the longitude to 0, and may calibrate the areas of the projected triangles to certain values depending on the latitude.

Therefore, the projection unit 120 may minimize, using sinusoidal projection, the occurrence of a phenomenon in which the shapes of triangles are deformed in a predetermined direction depending on the location of the longitude.

Further, the projection unit 120 may obtain similar results by applying sinusoidal projection, which is approximated by linearizing cosine functions into linear functions using sinusoidal projection, as shown in Equation (2).

The projection unit 120 may inclusively use various techniques capable of minimizing the influence of the latitude of ERP in addition to the technique using the approximated sinusoidal projection.

In this case, the projection unit 120 may calculate the coordinates of vertices of at least two triangular surfaces projected onto the virtual viewpoint image coordinate system using sinusoidal projection, and may calibrate the triangle quality values using the vertex coordinates.

Here, the projection unit 120 may obtain the calibrated triangle quality triangle_shape_calib by applying the calibrated vertices A', B' and C' of the corresponding triangle obtained through Equation (2) to a conventional triangle quality calculation method.

In order to prevent a phenomenon in which, when an ERP format synthesized image is generated through triangular warping, the quality of the projected triangle changes depending on the projected latitude, the projection unit 120 may calibrate the coordinates of three vertices through sinusoidal projection.

Here, the projection unit 120 may determine the color of each warped image by applying the triangular projection condition based on triangle_shape_calib using the following Equation (3) instead of Equation (1).

$$\frac{\text{triangle\_shape\_calib}_{new}}{\text{depth}_{new}^{\alpha}} > \frac{\text{triangle\_shape\_calib}_{old}}{\text{depth}_{old}^{\alpha}} \quad (3)$$

The blending unit 130 may blend warped images using blending weights that are calculated for respective pixels based on preset criteria for the warped images.

The blending unit 130 may calculate the blending weights using the ratios of the triangle quality values to the depth values of the pixels, and may blend the warped images using the blending weights.

$$w_{blending} = \left(\frac{\text{trangle\_shape}}{\text{depth}}\right)^{a} \quad (4)$$

Here, the blending unit 130 may calculate blending weights $w_{blending}$ for respective pixels of the warped images using the quality values and the depths of respective triangles, as shown in Equation (4), and may generate a blended warped image by obtaining a weighted-blending of color values for all warped images on a pixel basis.

In this case, the blending unit 130 may map a faulty patch, having a shape that is sagged by a distance by which neighboring pixels move away from each other, to a boundary portion having a large difference in depth. In this case, the blending weights for pixels in warped images at the same pixel location, depending on the change in a triangular shape, may be assigned.

The blending unit 130 may perform weighted-blending using the blending weights, thus reducing blending artifacts occurring in the process for blending the warped images.

Since the pixels of a sagged patch in the boundary portion are blended with weights much lower than those of normal pixels warped in other viewpoint images, the blending unit 130 may provide the blended warped image with further improved quality by adjusting the weights.

Also, when the blending weights of Equation (4) are calculated using triangle_shape without using the triangle_shape_calib obtained from the calibrated triangles, the blending weights are determined according to the sagged region of triangles. Thus it is reasonable that the blending unit 130 should decrease the blending weights of colors by amounts corresponding to the extent of sagging of sagged regions of the triangles from the standpoint of the amount of information.

For example, in the case of an ERP format image, although the quality of a triangle changes according to the latitude regardless of the difference between the depths of three vertices of the triangle and the change of viewpoint due to the image characteristics of the ERP format image, the colors of pixels can be interpolated only in sagged regions of the triangle. As a result, it is reasonable that the blending unit 130 should decrease the blending weights of colors by amounts corresponding to the extent of sagging of sagged regions of the triangle, from the standpoint of the amount of information.

The inpainting unit 140 may generate the finally synthesized virtual viewpoint image by filling the hole in the blended warped image with the color of an adjacent pixel having higher similarity.

Figure 2:
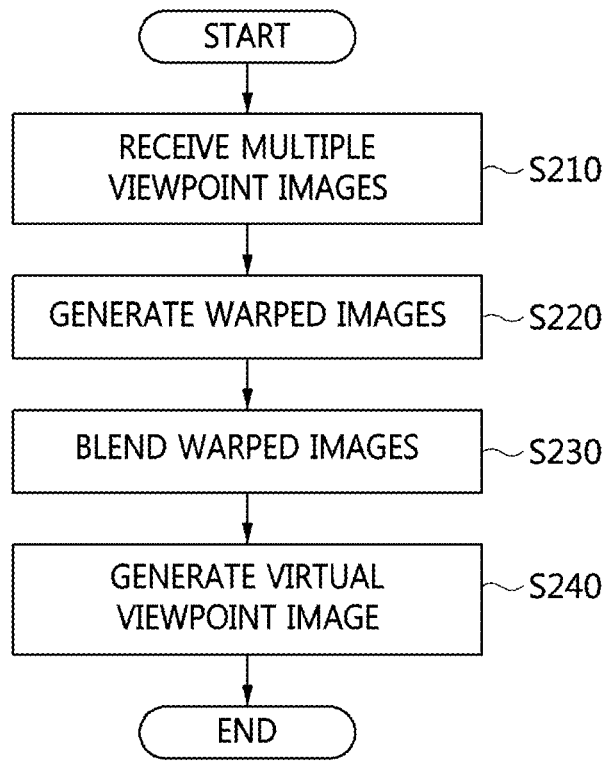
FIG. 2 is an operation flowchart illustrating a method for synthesizing virtual viewpoint images according to an embodiment of the present invention.

FIG. 2 is an operation flowchart illustrating a method for synthesizing virtual viewpoint images according to an embodiment of the present invention.

Referring to FIG. 2, in the method of synthesizing virtual viewpoint images according to the embodiment of the present invention, multiple viewpoint images may be received at step S210.

That is, at step S210, the multiple viewpoint images may be received from cameras which capture images at multiple viewpoints, and the multiple viewpoint images may be back-projected onto a world coordinate system in 3D space.

Here, at step S210, the multiple viewpoint images may be back-projected onto the world coordinate system in a 3D space using a predefined image projection scheme and parameters of the cameras.

Further, in the method of synthesizing virtual viewpoint images according to the embodiment of the present invention, warped images may be generated at step S220.

At step S220, the warped images may be generated by performing triangular warping which projects the multiple viewpoint images, back-projected on the world coordinate system, onto an image coordinate system corresponding to virtual viewpoints (hereinafter also referred to a "virtual viewpoint image coordinate system").

In this case, at step S220, three adjacent pixels in the multiple viewpoint images may be configured as each triangular surface, and the configured triangular surfaces may be projected onto the virtual viewpoint image coordinate system.

At step S220, triangular surfaces (or triangles), which are affine-transformed in various forms depending on the difference between the depths of vertices of triangles and the change of the viewpoint to a virtual viewpoint in a triangular warping process, may be projected onto the virtual viewpoint image coordinate system.

In this case, at step S220, the colors of pixels within each projected triangle may be determined by interpolating the colors of pixels at the locations onto which the vertices are projected, based on the ratio of the area of a triangle, which is defined by the locations onto which respective pixels of the projected triangle are projected, to the area of a triangle, which is defined by the locations onto which the vertices of the projected triangle are projected.

At step S220, when at least two triangular surfaces are projected onto the same pixel location in the virtual viewpoint image coordinate system, the warped images may be generated in consideration of a triangular projection condition.

In this case, at step S220, any one triangular surface may be determined by comparing the ratios of the triangle (triangular shape) quality values of at least two triangular surfaces projected onto the virtual viewpoint image coordinate system to the depth values of the pixels, as the triangular projection condition.

At step S220, artifacts occurring near poles formed during a procedure for projecting an Equi-Rectangular Projection (ERP) format image may be eliminated.

In triangular warping, the shape of a triangle may change depending on the difference between the depths of pixel points and the change of viewpoint. In particular, in a portion corresponding to a boundary (edge), at which a severe depth difference appears, a triangle having an excessively sagged shape may be projected, unlike a change in the shape occurring in the surface of an actual object.

The change of viewpoint which provides 6DoF in which rotation and motion are combined with each other may cause a phenomenon in which multiple triangles are warped to the same pixel location.

Here, at step S220, when multiple triangles are projected onto the same pixel location because a previously warped triangle has already been projected onto the corresponding warped image, the triangular projection condition based on a triangle quality value triangle_shape depending on the sagging of each triangle and the depth of each pixel depth, as represented by Equation (1), may be identified.

Here, at step S220, when the triangular projection condition of Equation (1) is satisfied, a warped image may be generated by replacing the color of a pixel within the triangle with the color of the corresponding pixel within a newly projected triangle.

In Equation (1), triangle_shape may be a triangle quality value obtained by quantitatively calculating the quality of the warped triangle depending on the projected shape of the warped triangle.

Since the triangle quality value is in inverse proportion to the length of the longest side of the projected triangle, it may then have a smaller value as the length of the longest side increases.

All of the pixels within the projected triangle may have the same triangle quality value triangle_shape.

Here, the maximum value and the minimum value of triangle_shape may be limited such that triangle_shape has values falling within a specific range. Also, triangle_shape may be implemented using variously modified calculation methods, which are not limited to specific methods in the present invention.

The pixel depth depth denotes the depth value of each pixel within the projected triangle estimated by interpolating the depth values of pixels at three vertices of the projected triangle, and may be a vertical distance in the case of a perspective format and a linear distance from a projection center in the case of an ERP format, depending on the projection format of the synthesized images.

Here, exponent α in depth$^α$ may be a parameter which can be used to control the degrees of importance of triangle_shape and depth upon identifying the triangular projection condition.

As the value of the exponent α, about 3, for example, may be used.

Further, at step S220, when pixels within multiple warped triangles are projected onto a specific pixel location of a warped image and the color at the corresponding pixel location should be determined to be the color of any one of multiple candidate pixels, the finally projected pixel may be selected as the depth decreases (i.e., as vertices are closer) and the triangle quality value increases (i.e., as a change in a shape is smaller), and then the color of the warped image may be determined.

Therefore, at step S220, a pixel within a triangle warped to the surface portion of an object closer to the specific pixel location may be selected, and a pixel within a triangle warped in the shape of a sagged triangle in a boundary portion, unlike an actual shape, or a pixel within a triangle warped to the background portion that is to be hidden and invisible due to the great depth may not be selected.

Further, in the case of an ERP format image, the shape of a projected triangle may change depending on the latitude of the ERP image coordinate system, in addition to the change depending on the depth difference or the viewpoint change.

In this case, at step S220, the triangle quality may be used differently by separating a warping process and a blending process in order to solve the problem with a conventional scheme that uses triangle quality in which the features of an ERP format image are not taken into consideration.

At step S220, sinusoidal projection may be used as one method for minimizing the influence of the latitude of the ERP image on a change in the shape of the projected triangle.

Here, at step S220, the triangle quality value triangle_shape_calib, which is calculated by calibrating the vertices of the projected triangle using sinusoidal projection, may be used as the triangle projection condition, so as to minimize the influence of the latitude of the ERP image.

At step S220, the ERP format image may be projected so that, regardless of the latitude, the areas of regions having the same size are similar areas using sinusoidal projection.

At step S220, a problem in which the size of a triangle changes depending on the latitude of the ERP format image may be solved.

At step S220, assuming that the three vertices A, B, and C of the projected triangle are $(x_A, y_A)$, $(x_B, y_B)$, and $(x_C, y_C)$, the coordinates of $(x'_A, y'_A)$, $(x'_B, y'_B)$, and $(x'_C, y'_C)$ of the vertices A', B' and C' of each triangle that is calibrated by applying sinusoidal projection to the triangle based on the longitude, may be calculated as represented by Equation (2).

In Equation (2), $\varphi_A$, $\varphi_B$, and $\varphi_C$ may denote respective latitudes of A, B, and C.

At step S220, $x_0$ may be calculated based on individual triangles using sinusoidal projection, as shown in Equation (2), the longitude may be set to 0, and the areas of the projected triangles may be calibrated to certain values depending on the latitude.

Therefore, at step S220, by using sinusoidal projection, the occurrence of a phenomenon in which the shapes of triangles are deformed in a predetermined direction depending on the location of the longitude may be minimized.

Further, at step S220, similar results may be obtained by applying sinusoidal projection, which is approximated by linearizing cosine functions into linear functions using sinusoidal projection, as shown in Equation (2).

At step S220, various techniques capable of minimizing the influence of the latitude of ERP may be inclusively used in addition to the technique using the approximated sinusoidal projection.

In this case, at step S220, the coordinates of vertices of at least two triangular surfaces projected onto the virtual viewpoint image coordinate system may be calculated using sinusoidal projection, and the triangle quality values may be calibrated using the vertex coordinates.

Here, at step S220, the calibrated triangle quality triangle_shape_calib may be obtained by applying the calibrated vertices A', B' and C' of the corresponding triangle obtained through Equation (2) to a conventional triangle quality calculation method.

Here, at step S220, in order to prevent a phenomenon in which, when an ERP format synthesized image is generated through triangular warping, the quality of the projected triangle changes depending on the projected latitude, the coordinates of three vertices may be calibrated through sinusoidal projection.

At step S220, the color of each warped image may be determined by applying the triangular projection condition based on triangle_shape_calib using Equation (3) instead of Equation (1).

Further, in the method of synthesizing virtual viewpoint images according to the embodiment of the present invention, the warped images may be blended at step S230.

That is, at step S230, warped images may be blended using blending weights that are calculated for respective pixels based on preset criteria for the warped images.

At step S230, the blending weights may be calculated using the ratios of the triangle quality values to the depth values of the pixels, and the warped images may be blended using the blending weights.

Here, at step S230, blending weights $w_{blending}$ for respective pixels of the warped images may be calculated using the quality values and the depths of respective triangles, as shown in Equation (4), and a blended warped image may be generated by obtaining a weighted-blending of color values for all warped images on a pixel basis.

In this case, at step S230, a faulty patch, having a shape that is sagged by a distance by which neighboring pixels move away from each other, may be mapped to a boundary portion having a large difference in depth. In this case, the blending weights for pixels in warped images at the same pixel location, depending on the change in a triangular shape, may be assigned.

At step S230, weighted-blending may be performed using the blending weights, thus reducing blending artifacts occurring in the process for blending the warped images.

At step S230, since the pixels of a sagged patch in the boundary portion are blended with weights much lower than those of normal pixels warped in other viewpoint images, the blended warped image with further improved quality may be provided by adjusting the weights.

Also, at step S230, when the blending weights of Equation (4) are calculated using triangle_shape without using the triangle_shape_calib obtained from the calibrated triangles, the blending weights are determined according to the sagged region of triangles. Thus, it is reasonable to decrease the blending weights of colors by amounts corresponding to the extent of sagging of sagged regions of the triangles from the standpoint of the amount of information.

For example, at step S230, in the case of an ERP format image, although the quality of a triangle changes according to the latitude regardless of the difference between the depths of three vertices of the triangle and the change of viewpoint due to the image characteristics of the ERP format image, the colors of pixels can be interpolated only in sagged regions of the triangle. As a result, it is reasonable to decrease the blending weights of colors by amounts corresponding to the extent of sagging of sagged regions of the triangle, from the standpoint of the amount of information.

Furthermore, in the method of synthesizing virtual viewpoint images according to the embodiment of the present invention, a virtual viewpoint image may be generated at step S240.

That is, at steep S240, the finally synthesized virtual viewpoint image may be generated by filling the hole in the blended warped image with the color of an adjacent pixel having higher similarity.

Figure 3:
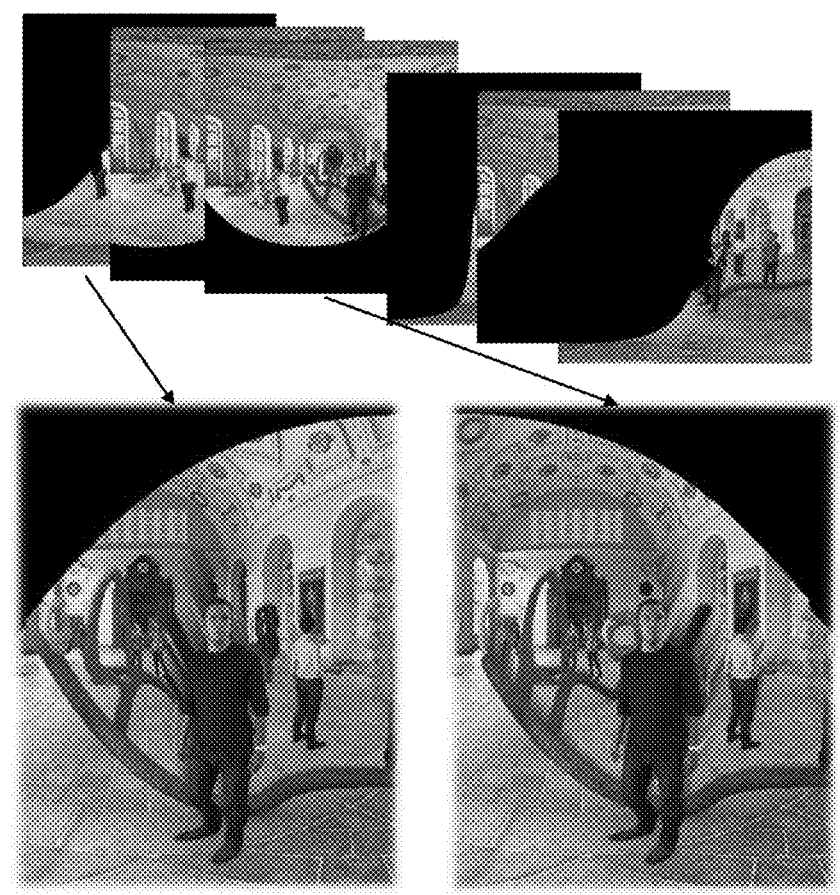
FIG. 3 is a diagram illustrating virtual viewpoint images in which input viewpoint images are warped to virtual viewpoint locations according to an embodiment of the present invention.
Figure 4:
FIG. 4 is a diagram illustrating a finally synthesized virtual viewpoint image obtained by performing blending and inpainting according to an embodiment of the present invention.

FIG. 3 is a diagram illustrating virtual viewpoint images in which input viewpoint images are warped to virtual viewpoint locations according to an embodiment of the present invention. FIG. 4 is a diagram illustrating a finally synthesized virtual viewpoint image obtained by performing blending and inpainting according to an embodiment of the present invention.

Referring to FIG. 3, it can be seen that, in a boundary portion having a large depth difference during a projection process, the shapes of projected triangles are warped in a shape that is sagged by a distance by which neighboring pixels move away from each other.

Referring to FIG. 4, during a blending procedure, blending weights depending on the change in the triangular shape are assigned to warped pixels of respective viewpoint images to the same pixel location, and a weighted-blending of the warped images is calculated using the blending weights, thus enabling synthesis artifacts to be decreased.

Here, since the pixels of the sagged patch in the boundary portion may be blended with weights lower than those of warped normal pixels in other viewpoint images, the quality of a synthesized image may change depending on the adjustment of the weights.

Figure 5:
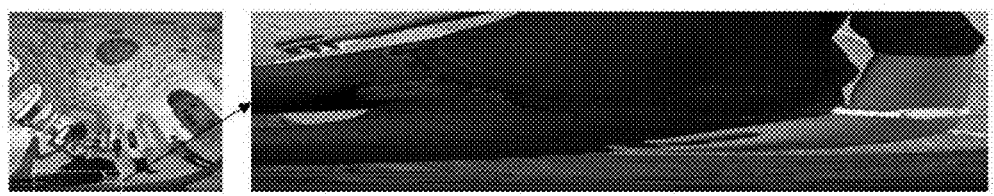
FIG. 5 is a diagram illustrating an actually acquired ground-truth image according to an embodiment of the present invention.
Figure 6:
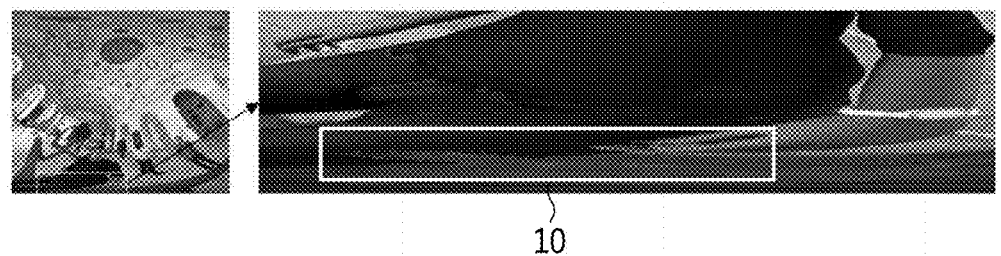
FIG. 6 is a diagram illustrating the results of image synthesis in which artifacts occur according to an embodiment of the present invention.
Figure 7:
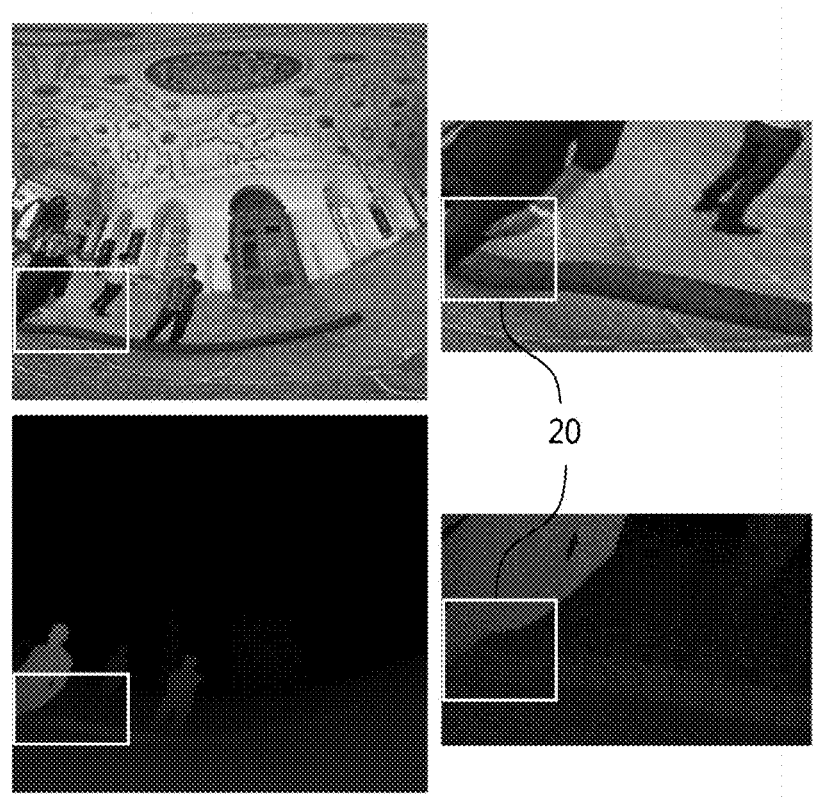
FIG. 7 is a diagram illustrating color and depth images acquired at an actual viewpoint according to an embodiment of the present invention.
Figure 8:
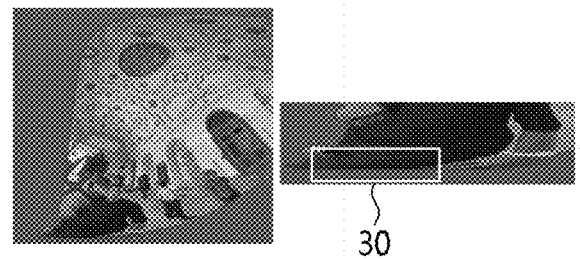
FIGS. 8 and 9 are diagrams illustrating artifacts occurring as a warping process progresses according to an embodiment of the present invention.
Figure 9:
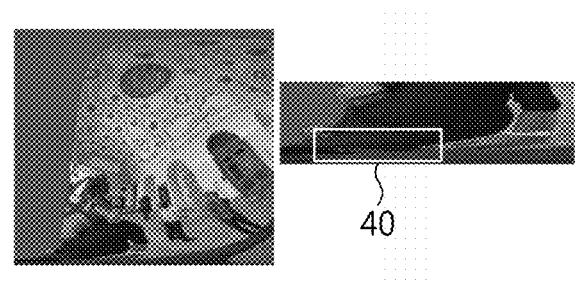

FIG. 5 is a diagram illustrating an actually acquired ground-truth image according to an embodiment of the present invention. FIG. 6 is a diagram illustrating the results of image synthesis in which artifacts occur according to an embodiment of the present invention. FIG. 7 is a diagram illustrating color and depth images acquired at an actual viewpoint according to an embodiment of the present invention. FIGS. 8 and 9 are diagrams illustrating artifacts occurring as a warping process progresses according to an embodiment of the present invention.

Referring to FIGS. 5 and 6, the results of image synthesis in which artifacts occur according to an embodiment of the present invention show that artifacts have occurred in ERP format images synthesized using the same triangle quality calculation method during a warped image generation process and a blending process.

In this case, it can be seen that the results of image synthesis of the ERP format images are examples of the results of experiments conducted using a TechnicolorMuseum image sequence which provides, as viewpoint images, omnidirectional 24 ERP format images that correspond to viewing angles of 180 degrees in a vertical direction and 180 degrees in a horizontal direction and that are used to verify the performance of omnidirectional image synthesis in MPEG.

Here, the results of image synthesis of the ERP format images show the results of synthesizing an image at a ninth viewpoint location using an actually acquired ninth viewpoint image (#9) and the remaining 23 viewpoints other than the ninth viewpoint.

At this time, the results of synthesis of the ERP format images show that a distorted portion (i.e., a portion in which artifacts occur) 10 is present in the synthesized virtual viewpoint image, unlike the input viewpoint image.

Referring to FIG. 7, artifacts in the virtual viewpoint image indicate that an unintended depth difference 20 occurs in triangle_shape because, during a warping process, triangle quality is influenced by the projected latitude of the ERP format image.

Referring to FIGS. 8 and 9, it can be seen that, during a procedure for warping a tenth viewpoint image (#10) to a ninth viewpoint image (#9), a pixel 30 within a triangle of a background area is projected onto a foreground area, and is selected as a finally warped image based on Equation (1), and thus artifacts 40 in the virtual viewpoint image occur.

Figure 10:
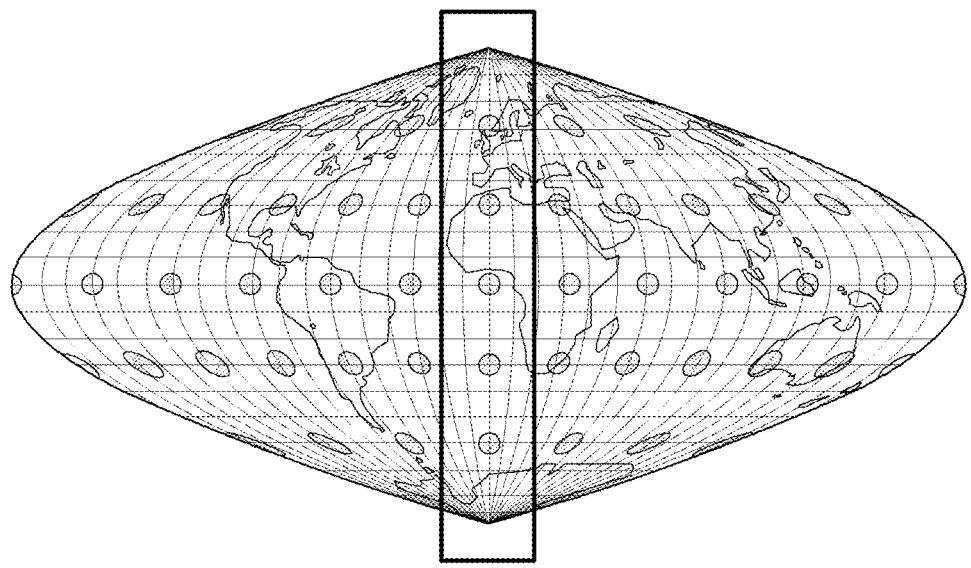
FIG. 10 is a diagram illustrating the features of sinusoidal projection according to an embodiment of the present invention.

FIG. 10 is a diagram illustrating the features of sinusoidal projection according to an embodiment of the present invention.

Referring to FIG. 10, the sinusoidal projection according to the embodiment of the present invention may calculate $x_0$ based on individual triangles using sinusoidal projection, as shown in Equation (2), may set longitude to 0, and may calibrate the areas of the projected triangles to constant values depending on the latitude.

Therefore, the sinusoidal projection may minimize, using sinusoidal projection, the occurrence of a phenomenon in which the shapes of triangles are deformed in a predetermined direction depending on the location of the longitude.

Further, the sinusoidal projection may obtain similar results by applying a sinusoidal projection that is approximated by linearizing cosine functions into linear functions using sinusoidal projection, as shown in Equation (2).

In addition to such an approximated scheme, the sinusoidal projection may also inclusively use various techniques capable of minimizing the influence of the latitude of ERP.

Figure 11:
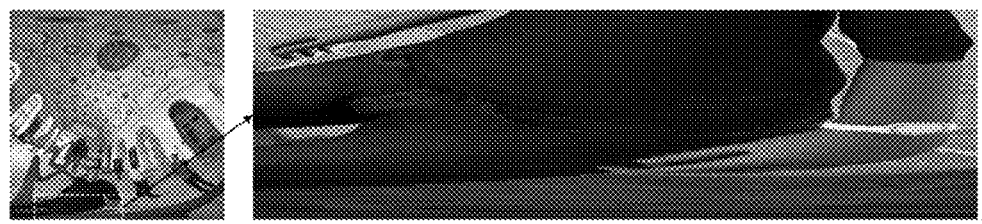
FIG. 11 is a diagram illustrating the results of image synthesis to which a virtual viewpoint imaging scheme is applied according to an embodiment of the present invention.

FIG. 11 is a diagram illustrating the results of image synthesis to which a virtual viewpoint imaging scheme is applied according to an embodiment of the present invention.

Referring to FIG. 11, image synthesis results generated from a projection scheme using triangle_shape_calib and a blending scheme using blending weights according to an embodiment of the present invention are illustrated.

As illustrated in FIG. 11, it can be seen that, in the image synthesis results generated from the projection scheme using triangle_shape_calib and the blending scheme using blending weights, artifacts do not occur, unlike the results of image synthesis of FIGS. 5 and 6.

Figure 12:
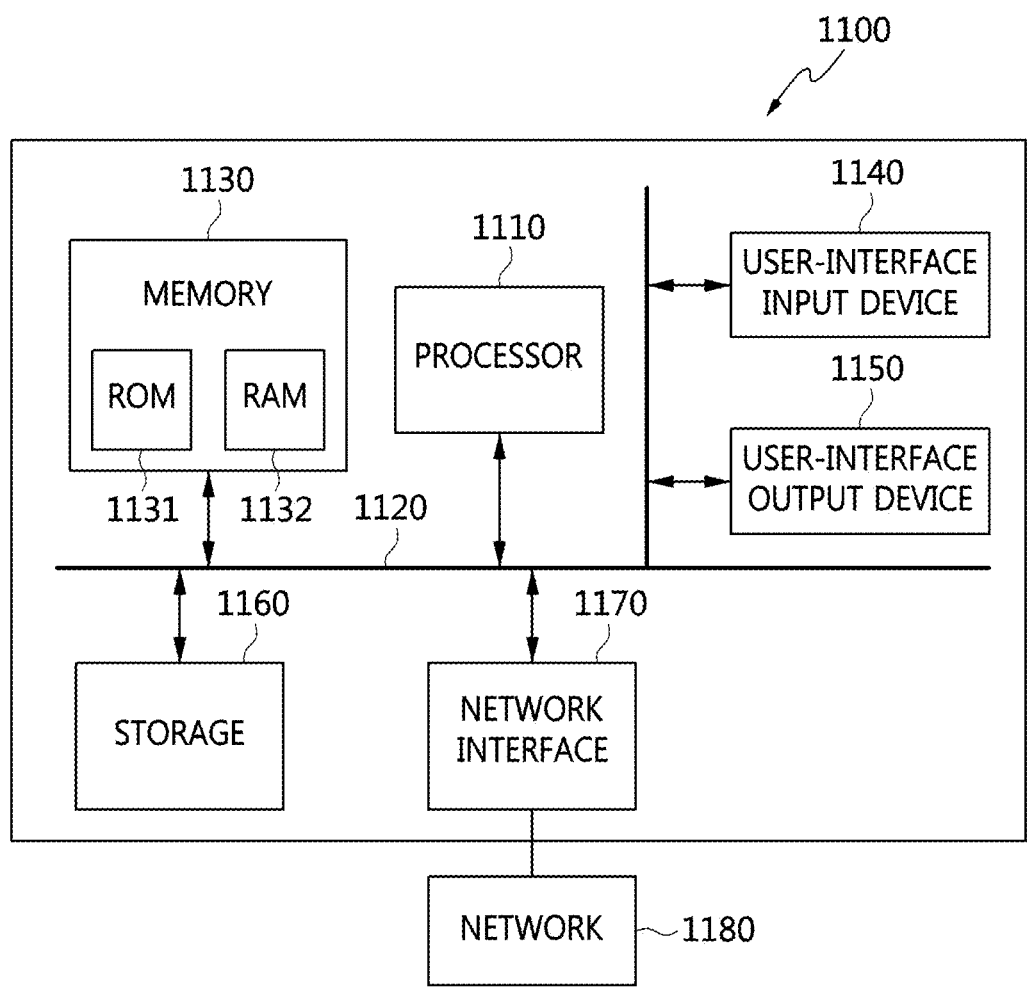
FIG. 12 is a diagram illustrating a computer system according to an embodiment of the present invention.

FIG. 12 is a diagram illustrating a computer system according to an embodiment of the present invention.

Referring to FIG. 12, the apparatus for synthesizing virtual viewpoint images according to an embodiment of the present invention may be implemented in a computer system 1100, such as a computer-readable storage medium. As illustrated in FIG. 12, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The apparatus for synthesizing virtual viewpoint images according to the embodiment of the present invention may include one or more processors 1110 and execution memory 1130 for storing at least one program that is executed by the one or more processors 1110, wherein the at least one program is configured to receive multiple viewpoint images from cameras that capture images of multiple viewpoints, and back-project the multiple viewpoint images onto a world coordinate system in a three-dimensional (3D) space, generate warped images by performing triangular warping of projecting the multiple viewpoint images, back-projected onto the world coordinate system, onto a virtual viewpoint image coordinate system, and generate a finally synthesized virtual viewpoint image by blending the warped images.

Here, the triangular warping may configure three adjacent pixels in the multiple viewpoint images as each triangular surface and to project the triangular surface onto the virtual viewpoint image coordinate system.

Here, the at least one program may be configured to, when at least two triangular surfaces are projected onto an identical pixel location in the virtual viewpoint image coordinate system, generate the warped images in consideration of a triangular projection condition.

Here, the at least one program may be configured to compare ratios of triangle quality values of the at least two triangular surfaces projected onto the virtual viewpoint image coordinate system to depth values of the pixels, as the triangular projection condition, and then determine any one triangular surface.

Here, the at least one program may be configured to calculate coordinates of vertices of the at least two triangular surfaces projected onto the virtual viewpoint image coordinate system using sinusoidal projection and calibrate the triangle quality values using the coordinates of the vertices.

Here, the at least one program may be configured to calculate blending weights using the ratios of the triangle quality values to the depth values of the pixels and blend the warped images using the blending weights.

The present invention may provide synthesis of virtual viewpoint images having improved quality.

Further, the present invention may eliminate artifacts occurring in image synthesis.

Furthermore, the present invention may improve the quality of image synthesis in an omnidirectional image in virtual reality (VR).

Furthermore, the present invention may utilize the synthesis of virtual viewpoint images for VR video service for providing a more highly immersive 6 DoF viewpoint.

As described above, in the apparatus and method for synthesizing virtual viewpoint images according to the present invention, the configurations and schemes in the above-described embodiments are not limitedly applied, and some or all of the above embodiments can be selectively combined and configured such that various modifications are possible.

What is claimed is:

1. An apparatus for synthesizing virtual viewpoint images, comprising:
one or more processors; and
an execution memory for storing at least one program that is executed by the one or more processors,
wherein the at least one program is configured to:
receive multiple viewpoint images from cameras that capture images of multiple viewpoints, and back-project the multiple viewpoint images onto a world coordinate system in a three-dimensional (3D) space,
generate warped images by performing triangular warping of projecting the multiple viewpoint images, back-projected onto the world coordinate system, onto a virtual viewpoint image coordinate system, and
generate a finally synthesized virtual viewpoint image by blending the warped images
wherein the triangular warping is configured to configure three adjacent pixels in the multiple viewpoint images each as a triangular surface and to project the triangular surface onto the virtual viewpoint image coordinate system,
wherein the at least one program is configured to calculate coordinates of vertices of at least two triangular surfaces projected onto the virtual viewpoint image coordinate system using sinusoidal projection and calibrate triangle quality values using the coordinates of the vertices.

2. The apparatus of claim 1, wherein the at least one program is configured to, when the at least two triangular surfaces are projected onto an identical pixel location in the virtual viewpoint image coordinate system, generate the warped images in consideration of a triangular projection condition.

3. An apparatus for synthesizing virtual viewpoint images, comprising:
one or more processors; and
an execution memory for storing at least one program that is executed by the one or more processors,
wherein the at least one program is configured to:
receive multiple viewpoint images from cameras that capture images of multiple viewpoints, and back-project the multiple viewpoint images onto a world coordinate system in a three-dimensional (3D) space,
generate warped images by performing triangular warping of projecting the multiple viewpoint images, back-projected onto the world coordinate system, onto a virtual viewpoint image coordinate system, and
generate a finally synthesized virtual viewpoint image by blending the warped images,
wherein the triangular warping is configured to configure three adjacent pixels in the multiple viewpoint images each as a triangular surface and to project the triangular surface onto the virtual viewpoint image coordinate system,
wherein the at least one program is configured to when at least two triangular surfaces are projected onto an identical pixel location in the virtual viewpoint image coordinate system, generate the warped images in consideration of a triangular projection condition and compare ratios of triangle quality values of the at least two triangular surfaces projected onto the virtual viewpoint image coordinate system to depth values of the pixels, as the triangular projection condition, and then determine any one triangular surface.

4. The apparatus of claim 3, wherein the at least one program is configured to calculate coordinates of vertices of the at least two triangular surfaces projected onto the virtual viewpoint image coordinate system using sinusoidal projection and calibrate the triangle quality values using the coordinates of the vertices.

5. The apparatus of claim 3, wherein the at least one program is configured to calculate blending weights using the ratios of the triangle quality values to the depth values of the pixels and blend the warped images using the blending weights.

6. A method for synthesizing virtual viewpoint images, the method being performed by an apparatus for synthesizing virtual viewpoint images, the method comprising:
receiving multiple viewpoint images from cameras that capture images of multiple viewpoints, and back-project the multiple viewpoint images onto a world coordinate system in a three-dimensional (3D) space,
generating warped images by performing triangular warping of projecting the multiple viewpoint images, back-projected onto the world coordinate system, onto a virtual viewpoint image coordinate system, and
generating a finally synthesized virtual viewpoint image by blending the warped images,
wherein the triangular warping is configured to configure three adjacent pixels in the multiple viewpoint images each as a triangular surface and to project the triangular surface onto the virtual viewpoint image coordinate system,
wherein generating the warped images is configured to calculate coordinates of vertices of at least two triangular surfaces projected onto the virtual viewpoint image coordinate system using sinusoidal projection and calibrate triangle quality values using the coordinates of the vertices.

7. The method of claim 6, wherein generating the warped images is configured to, when the at least two triangular surfaces are projected onto an identical pixel location in the virtual viewpoint image coordinate system, generate the warped images in consideration of a triangular projection condition.

8. A method for synthesizing virtual viewpoint images, the method being performed by an apparatus for synthesizing virtual viewpoint images, the method comprising:
receiving multiple viewpoint images from cameras that capture images of multiple viewpoints, and back-project the multiple viewpoint images onto a world coordinate system in a three-dimensional (3D) space,
generating warped images by performing triangular warping of projecting the multiple viewpoint images, back-projected onto the world coordinate system, onto a virtual viewpoint image coordinate system, and
generating a finally synthesized virtual viewpoint image by blending the warped images,
wherein the triangular warping is configured to configure three adjacent pixels in the multiple viewpoint images each as a triangular surface and to project the triangular surface onto the virtual viewpoint image coordinate system,
wherein generating the warped images is configured to when at least two triangular surfaces are projected onto an identical pixel location in the virtual viewpoint image coordinate system, generate the warped images in consideration of a triangular projection condition and compare ratios of triangle quality values of the at least two triangular surfaces projected onto the virtual viewpoint image coordinate system to depth values of the pixels, as the triangular projection condition, and then determine any one triangular surface.

9. The method of claim 8, wherein generating the warped images is configured to calculate coordinates of vertices of the at least two triangular surfaces projected onto the virtual viewpoint image coordinate system using sinusoidal projection and calibrate the triangle quality values using the coordinates of the vertices.

10. The method of claim 8, wherein generating the finally synthesized virtual viewpoint image is configured to calculate blending weights using the ratios of the triangle quality values to the depth values of the pixels and blend the warped images using the blending weights.

* * * * *